July 2, 1929.  L. W. BROWNE  1,719,687
SNAP ACTING VALVE
Filed Aug. 29, 1928
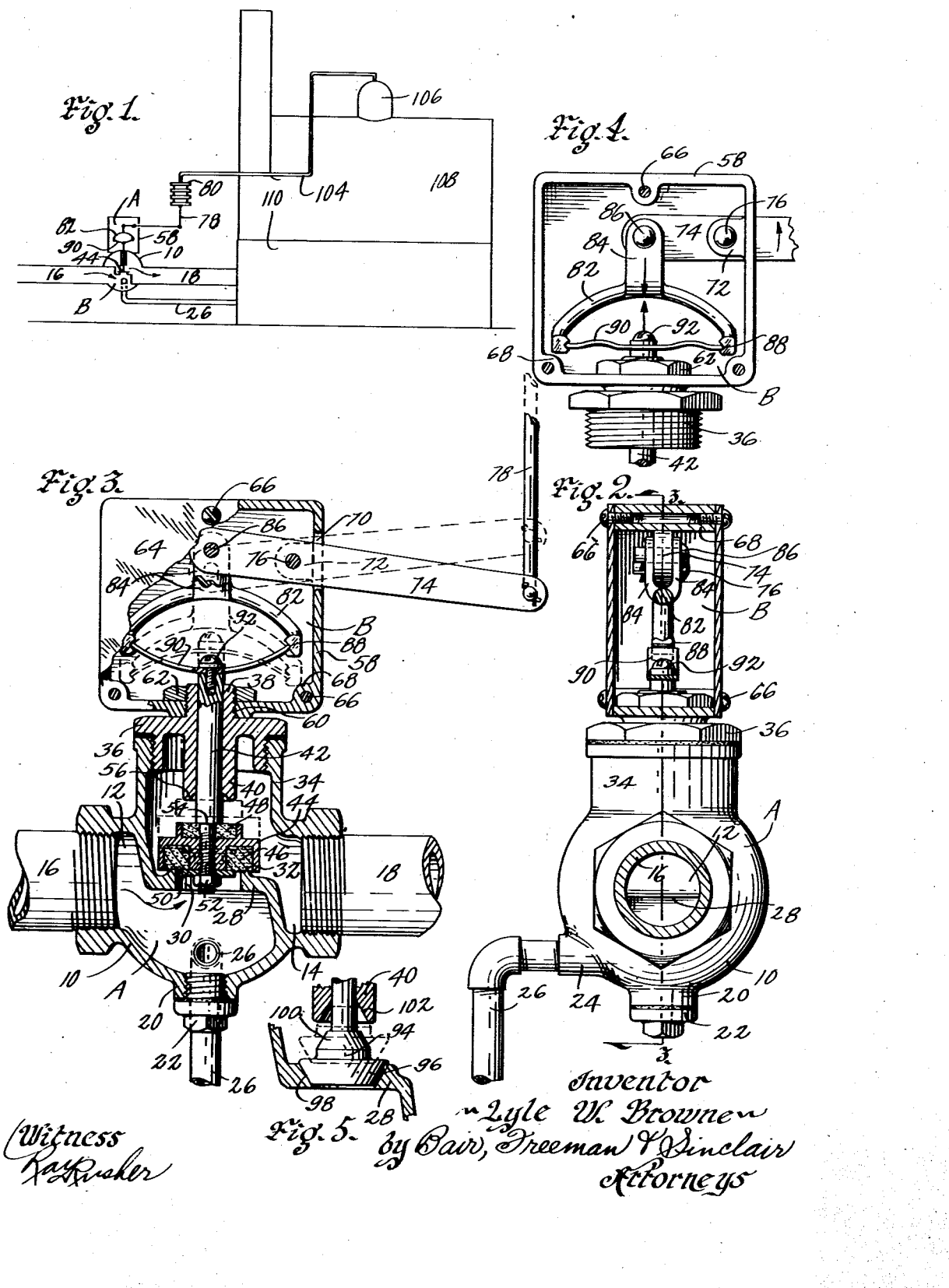
Inventor
Lyle W. Browne
by Bair, Freeman & Sinclair
Attorneys Patented July 2, 1929.

1,719,687

UNITED STATES PATENT OFFICE.

LYLE W. BROWNE, OF MARSHALLTOWN, IOWA, ASSIGNOR TO THE FISHER GOVERNOR COMPANY, OF MARSHALLTOWN, IOWA.

SNAP-ACTING VALVE.

Application filed August 29, 1928. Serial No. 302,658.

The object of my invention is to provide a valve structure of the snap acting type, whereby an actuating arm may be moved by a controlling device and will control the valve to either bring it to a full open or full closed position with a snap action, the parts of the valve structure being comparatively simple and the valve itself being of durable and inexpensive construction.

Still a further object is to provide within the valve structure, a valve seat having a valve member coacting therewith for holding the valve in closed position, a sealing seat being arranged on a sleeve which slidably supports the valve stem and with which the valve member may coact for the purpose of sealing the valve against leakage of a fluid or gas passing therethrough, which leakage would occur around the stem, this construction eliminating the necessity of providing a packing and packing nut for the valve stem and thereby considerably cutting down friction on the valve stem.

More specifically, it is my purpose to provide a snap acting device consisting of a yoke having notches formed in the arms thereof with a normally bowed leaf spring having its ends resting in the notches and its central portion attached to the valve stem, whereby movement of the yoke in one direction will tend to bow the leaf spring in an opposite direction for actuating the valve stem with a snap action.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a diagrammatic view of my valve structure showing one way in which it may be installed for the purpose of controlling the flow of a fluid or gas to the combustion chamber under a boiler.

Figure 2 is an end elevation of the valve showing a pipe leading thereto in cross section and showing the casing on top of the valve and parts within the casing in section.

Figure 3 is a sectional view on the line 3—3 of Figure 2.

Figure 4 is a side elevation of the casing on top of the valve as attached to the valve head and illustrates the snap acting portions of the valve being actuated for moving the valve from closed position to opened position; and Figure 5 is a sectional view through a portion of a modified type of valve in which is illustrated a different valve seat and valve member from the type shown in Figure 3.

On the accompanying drawings, I have used the reference character A to indicate generally, a valve structure and the character B to indicate a casing mounted on the valve structure A and adapted to contain the snap acting parts of the valve. The valve structure A comprises a body portion 10 having a threaded inlet opening 12 and an outlet opening 14. The inlet and outlet pipes of the valve are indicated at 16 and 18 respectively.

A boss 20 is formed on the lower portion of the valve body 10 and is internally screw threaded to receive a screw plug 22. The plug 22 may be removed for the purpose of draining the valve body or removing sediment therefrom. A boss 24 is formed on the side of the valve body 10 and is adapted to receive a pipe line 26 leading to a pilot light.

Within the valve body 10 a partition 28 is formed having an opening 30 therein. An annular raised portion 32 around the opening 30 provides a valve seat. A tubular portion 34 is formed on the valve body 10 and is threaded to receive a head 36. The head 36 is provided with an upwardly extending portion 38 and a downwardly extending sleeve 40.

Slidably mounted in the head 36 is a valve stem 42. A valve member 44 is screwed onto the lower end of the stem 42. The valve member 44 is provided with sockets in its lower and upper surfaces into which are placed composition disks 46 and 48. The composition washer 46 is held in position by a washer 50 and a nut 52. The composition washer 48 is confined between a shoulder 54 on the valve stem 42 and the bottom of its socket in the valve member 44. It will be noted that the lower end of the sleeve 40 is formed into an annular raised seat 56, the purpose of which will hereinafter be fully described.

The casing B consists of a substantially square frame 58 open on both sides and having a screw threaded opening 60 to screw onto the boss 38 of the head 36. A lock nut 62 is provided for the purpose of insuring that the casing B will remain on the boss 38. The open sides of the frame 58 are normally covered by cover plates 64 held in position by screws 66. The screws 66 extend into threaded enlargements 68 formed within the frame 58.

A slot 70 is formed in one side of the frame 58 and on each side of this slot, ears 72 are provided. An actuating lever 74 extends through the slot 70 and is pivoted on a pin 76 extending through the ears 72. The outer end of the arm 74 may be operatively connected by a rod 78 or other means to a float, a thermostat, a pressure actuated diaphragm or a pressure actuated bellows. In the diagrammatic view Figure 1, it is shown as being connected to a pressure actuated bellows 80.

Within the casing B a yoke 82 is provided. The yoke 82 has a pair of upstanding ears 84 pivoted by means of a pin 86 to the inner end of the actuating lever 74. Adjacent the ends of the arms of the yoke 82 notches 88 are formed for the purpose of receiving the ends of a normally bowed leaf spring 90. The central portion of the leaf spring 90 is connected by means of a screw 92 to the upper end of the valve stem 42.

In Figure 5 of the drawings, I have illustrated a modified form of valve member 94 to take the place of the valve member 44. The valve member 94 is provided with a conical portion 96 adapted to seat against a cone seat 98. The valve member 94 is formed with another conical portion 100 adapted to seat against a cone seat 102 formed in the sleeve 40 of the head 36.

*Practical operation.*

In the operation of my improved valve structure, the actuating arm 74 may be connected to the pressure actuated bellows 80. The bellows 80 is connected by a pipe line 104 to the steam dome 106 of the steam boiler 108. The inlet pipe 16 may be connected with a supply of liquid or gas fuel, the flow of which is to be controlled by the valve structure B. The outlet pipe 18 extends to the combustion chamber 110 below the boiler 108. In the operation of such an installation, the pipe 26 extends to the pilot light within the combustion chamber, which being connected with the source of supply from the pipe 16 due to the fact that the boss 24 is formed below the partition 28, will cause the pilot light to burn continuously.

The parts being in the position shown in Figure 3 indicate that the desired head of pressure is present within the steam dome 106. As such pressure decreases, the rod 78 will move upwardly as indicated in Figure 4 until the notches 88 in the yoke 82 are substantially level with the central portion of the leaf spring 90. This will cause the leaf spring to buckle, as shown, and as the yoke moves a little distance further, the spring will quickly snap to the dotted line position illustrated in Figure 3, in which position the spring will be bowed in an opposite direction. This quickly raises the valve member 44 for removing the composition disk 46 from the seat 32 so that the gas or fluid from the inlet pipe 16 will flow through the pipe 18 and into the burner within the combustion chamber 110.

Upon the valve member 44 assuming the position shown in dotted lines in Figure 3, the composition disk 48 will seat against the raised portion 56 of the sleeve 40 for preventing the escape of gas from the upper portion of the valve body between the sleeve 40 and the valve stem 42. Thus, the necessity of providing a packing means for the valve stem and the attendant friction caused thereby are entirely eliminated. By such a construction, a very light leaf spring has sufficient resiliency to slide the valve stem for either fully opening or fully closing the valve.

The leaf spring 90 is in reality, flat or straight before its ends are inserted in the notches 88 of the yoke 82. Since its length is greater than the distance between the notches, it is placed under tension when assembled relative to the yoke and becomes bowed. It is this bowed position of the spring that I have referred to as "normally bowed" throughout my specification and claims.

Referring to Figure 5 of the drawings, the portion 96 is of metal and is ground to fit the seat 98 and similarly, the portion 100 is ground to fit the seat 102. The valve member 94 acts in the same capacity as the valve member 44, the only difference being that it is made of all metal instead of having composition disks inserted in it for contacting with the respective seats, as shown in Figure 3. It will be obvious that I have provided a type of valve structure which can be actuated by various devices for controlling the flow of various gases or fluids, depending upon what type of installation is to be made with the valve. I wish it to be understood that my construction need not necessarily be limited to the connection between the ends of the leaf spring 90 and the yoke 82 as being the notches 88 illustrated on my drawing, but that any equivalent connection providing for pivotal movement of the spring ends relative to the yoke might be devised and effectively used as a substitute.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A snap acting valve structure comprising a valve body, a valve seat therein, a valve member to coact with said seat for closing the valve, a movable yoke, a normally bowed leaf spring between the ends of said yoke, and means of connection between said leaf spring and said valve member.

2. A snap acting valve structure comprising a valve body, a valve seat therein, a valve member to coact with said seat for closing the valve, a movable member, a resilient bowed member supported thereby and means for operatively connecting said last mentioned member to said valve member.

3. A snap acting valve structure comprising a valve body, a valve seat therein, a valve member to coact with said seat for closing the valve, a valve stem on said valve member, a sealing seat in said valve body, said valve member having a portion to coact therewith for sealing against leakage between the valve stem and the valve body when the valve is opened, a movable yoke, a normally bowed leaf spring between the ends of said yoke and means of connection between said leaf spring and said valve member.

4. A snap acting valve structure comprising a valve body, a valve seat therein, a valve member to coact with said seat for closing the valve, a valve stem on said valve member, a sealing seat in said valve body, said valve member having a portion to coact therewith for sealing against leakage between the valve stem and the valve body when the valve is opened, a movable member, a resilient bowed member supported thereby and means for operatively connecting said last mentioned member to said valve member.

5. A snap acting valve structure comprising a valve body, a valve seat therein, a valve member to coact with said seat for closing the valve, a casing on said valve body, an arm pivotally mounted on said casing, a yoke pivoted to said arm, notches in the arms of said yoke and facing each other, a normally bowed leaf spring having its ends received in said notches and means for operatively connecting the central portion of said leaf spring with said valve member.

6. A snap acting valve structure comprising a valve body, a valve seat therein, a valve member to coact with said seat for closing the valve, a movable yoke, a normally bowed leaf spring between the ends of said yoke, means of connection between said leaf spring and said valve member, and an outlet opening in said valve body on the intake side of the valve seat.

7. A snap acting valve structure comprising a valve body, a valve seat therein, a valve member to coact with said seat for closing the valve, a valve stem on said valve member, a head having a sleeve for slidably receiving said valve stem, said sleeve having a seat with which the valve member coacts when the valve is in open position, a movable yoke, a normally bowed leaf spring between the ends of said yoke and means of connection between said leaf spring and said valve member.

8. A snap acting valve structure comprising a valve body, a valve seat therein, a valve member to coact with said seat for closing the valve, a valve stem on said valve member, a head having a sleeve for slidably receiving said valve stem, said sleeve having a seat with which the valve member coacts when the valve is in open position, an extension on said valve head, a casing supported on said extension, an arm pivotally mounted on said casing, a yoke pivoted to said arm, notches in the arms of said yoke and facing each other, a normally bowed leaf spring having its ends received in said notches and means for operatively connecting the central portion of said leaf spring with said valve member.

Des Moines, Iowa, August 13, 1928.

LYLE W. BROWNE.